Patented June 8, 1943

2,320,999

UNITED STATES PATENT OFFICE 2,320,999

BONDING RUBBERLIKE PLASTICS AND ALUMINUM

Murray C. Beebe, Mount Carmel, Conn., assignor to Scovill Manufacturing Company, Waterbury, Conn., a corporation of Connecticut No Drawing. Application May 14, 1940, Serial No. 335,171

5 Claims. (Cl. 154—2)

The invention or discovery relates to bonding rubber-like plastics and aluminum; and it comprises a method of making composite articles comprising aluminum or aluminum alloy articles and neoprene or rubber bonded together, wherein rubber or neoprene is applied to the dried surface of an aluminum article which has been given a filmiform coating cohering thereto by subjection to the action of an aqueous ammoniacal solution containing dissolved alumina, beryllia, titania or zirconia, a dissolved metal compound selected from the class consisting of salts of copper and salts of the iron group of metals, and a complex-forming substance, drying and applying the rubber or neoprene; all as more fully hereinafter set forth and as claimed.

In recently developed aircraft constructions it has become desirable to unite substantial layers of neoprene or rubber to aluminum parts, especially propeller blades; to produce composite articles of aluminum and the rubber or rubber-like plastic with a union which is a cohesion rather than an adhesion. In making a composite propeller blade, because of the severe shearing stresses, an absolute bond is necessary; the bond must be at least equal in strength to the tearing strength of the rubber itself, and must resist stripping. Propeller fairings carrying rubber are subject to violent shearing and tensile stresses in use, and moreover are subject to extreme atmospheric conditions. It is necessary that there be no avenue through which moisture can enter between the rubber and the aluminum.

Articles of metallic aluminum carry a thin dense coating of oxide and to this coating rubber does not cohere. Methods of bonding rubber to metals have been proposed which involve an etching or roughening of the metal surface in an acid bath thereby giving a mechanical locking engagement; the rubber is "frictioned" on, as the phrase is. This is undesirable in such articles as airplane propellers, partly because the union is not absolute and partly because etching a surface of an aluminum article weakens it. Such a roughening of the surface may cause a serious degradation of the physical properties of the propeller. A roughened aluminum structural member is much more subject to fatigue failure than a smooth one. The difficulties in bonding neoprene or rubber to aluminum are increased where aluminum is alloyed with zinc.

I have discovered that neoprene or rubber can be caused to cohere with a substantially perfect bond to aluminum articles which have been treated in certain baths to deposit a coating film thereon; a coating which is strongly coherent to the article itself (or, rather to the natural oxide coating thereon) and which in turn will cohere with neoprene or rubber. The invention works as well with aluminum alloyed with zinc as with pure aluminum.

In the treatment the aluminum metal itself is not noticeably attacked; tests show no deterioration of the physical properties of the metal article. Nevertheless some alumina from the oxide coating probably enters the bath. Bath liquors containing alumina in colloidal condition are particularly well suited for my purposes, but I have noticed that some baths made without added alumina will nevertheless work well and I attribute this to alumina entering the bath from the work.

The basis of my treating baths is usually aqueous ammonia, in which is dissolved a compound of metal which will unite with the coating of oxide naturally present on the article. The metal compound is held in solution with the aid of the ammonia and a complex-forming anion. The bath is rather dilute with respect to all constituents. In one of the best embodiments of the invention at present known to me the bath comprises copper oxide. Sometimes I employ dissolved nickel, iron, cobalt or aluminum itself. The bath after being put into use contains a small amount of alumina which, as stated, enters from the articles being treated. Beryllia, zirconia or titania can be incorporated in the bath in colloidal form in lieu of alumina or in addition to alumina. The solution, as ordinarily made, contains some thiosulfate, phosphate, citrate or other substance capable of forming an ion-containing complex. Organic substances of the type of glue and gum arabic can be included in the bath, in lieu of these ion-forming complexes or in addition thereto. Either type of material acts something like an addition agent as understood in electroplating practice. Such agents are accordingly beneficial in promoting the formation of desirable fine grain deposits. Obviously, therefore, they are advantageously and ordinarily included in the treatment bath because of their adjunctive benefits. On the other hand their use is optional since their presence is not essential to the practice of the process herein disclosed. The presence of sulfur in some form in the solution is desirable. The coating is best when it contains a trace of sulfide sulfur.

In my copending applications Ser. No. 206,273 filed May 5, 1938, for Coating metal articles and Ser. No. 307,721 filed Dec. 5, 1939 for Bonding rubber to aluminum, there are disclosed and claimed processes of bonding rubber to aluminum including the step of treating the aluminum in complex alkaline nickel-containing baths and hydrolyzed ammoniacal alumina baths, respectively. The present invention relates specifically to bonding neoprene or rubber to aluminum with the aid of a film developed on the aluminum by contact with a complex alkaline copper oxide-containing bath.

In an embodiment of the present invention an aluminum article is first cleaned and is dipped in a warm or hot dilute ammoniacal bath containing dissolved copper oxide and a complex-forming substance such as sodium thiosulfate (hypo), boric acid, orthophosphoric acid ($H_3PO_4$), etc. The composition of the bath is specifically different depending on the character of the rubber-like plastic to be bonded. For bonding neoprene the best baths contain ammonium carbonate, hypo and phosphoric acid, in addition to the ammonia and copper. Ammoniacal copper oxide baths containing nickel and boric acid work best for bonding rubber.

The article is left in the bath for a time to develop a coating film thereon. Development of the film is not instantaneous. In general, film-forming takes place gradually over a period of some minutes, the rate of formation gradually falling off. After half an hour or thereabouts there is little further action. The article is left in the bath until a film of the requisite thickness is formed and it is then rinsed and dried, and is then ready for application of rubber or neoprene. Usually a layer of neoprene cement or rubber cement is first applied to the filmed aluminum, but in some cases the neoprene or rubber layer is bonded directly thereon by heat and pressure. In either case coherence is good.

In a specific example illustrative of one good embodiment of the invention the inner or hub portion of a zinciferous aluminum alloy propeller blade was cleaned by buffing with a greaseless buffing compound containing alumina as the abrasive, and was suspended in a bath of the following composition, maintained at 160° to 180° F.:

| | | |
|---|---|---|
| Water | liters__ | 90 |
| Aqueous $NH_4OH$ (concentrated solution; specific gravity=0.88) | do____ | 10 |
| $Cu(OH)_2$ | grams__ | 300 |
| $Na_2S_2O_3$ (hypo) | do____ | 2,000 |
| $(NH_4)_2CO_3$ | do____ | 500 |
| $H_3PO_4$ (commercial syrup, 85% strength) | | 50 |

The article was left in the bath for one-half hour, and was then removed, dipped in water and dried. A coating of neoprene cement was applied. After the solvent had evaporated, a thin sheet of neoprene was laid over the cement on the part of the blade which was to be provided with a fairing. Then the blade was put in a mold of suitable contour, with cellular rubber in uncured state, and subjected to heat and pressure to cure the rubber. The cellular rubber was then covered with a layer of non-porous neoprene and removed to a finishing mold of contour conforming to the desired fairing. Heat and pressure were applied and the blade then removed. The fairing was satisfactory in every respect and coherence with the metal blade exceeded the breaking strength of the rubber.

In such an embodiment the coating film yields when stripped with nitric acid and analyzed, aluminum with copper and small amounts of phosphorus and sulfur. The film contains some oxygen and is doubtless hydrated to some extent.

The above bath is especially well adapted for bonding neoprene to aluminum though it gives good results in bonding rubber as well. The following bath gives coatings exhibiting excellent coherence with rubber, employed in a manner similar to that described in the foregoing example:

| | | |
|---|---|---|
| Water | liters__ | 90 |
| Aqueous $NH_4OH$ (concentrated solution; specific gravity=0.88) liters__ | | 5 to 10 |
| $Cu(OH)_2$ | kilogram__ | 0.3 to 1 |
| Nickel acetate | do____ | 0.3 to 1 |
| Hypo | do____ | 1 to 2 |
| Boric acid | do____ | 0.15 to 0.5 |

In these baths, the proportions of the ingredients can be varied over a considerable range while achieving good results. In the bath of the first example the ammonia content can be reduced to 5 liters with no change except for a slowing down of the film forming action, the hypo content can be varied in the range 1000 to 2000 grams, and the proportions of ammonium carbonate and phosphoric acid can be similarly varied.

The bath can contain iron or cobalt in addition to the copper. Following is an example of a good iron-containing bath:

| | | |
|---|---|---|
| Water | liters__ | 100 |
| $NH_4OH$ as above | do____ | 10 |
| $Cu(OH)_2$ | grams__ | 300 |
| Hypo | do____ | 2000 |
| Iron phosphate | do____ | 100 |

The various baths described work best hot (160° to 180° F.) and give good films with treatment times of from a few minutes to a half hour. In general the baths are so dilute and the ingredients so cheap that no attempt is made to regenerate an exhausted bath; it is simply discarded. The solid content of the baths is only 2 or 3 per cent.

Aluminum articles treated according to the invention are adapted for coherence with rubber and the various synthetic rubbers, modified rubbers (vulcanized rubber, chlorinated rubbers, rubber hydrochlorides, etc.) and rubber-like plastics. Neoprene is particularly useful for propeller fairings because of its resistance to weather and sunlight and its oil-resistant properties. The neoprenes are polymerized chlorobutadienes and are sometimes called polychloroprenes or chloroprenes. Other rubber substitutes useful in the invention are the butadiene rubbers: butadiene-acrylic-acid-nitrile mixed polymerizate, sold as Perbunan or Buna N.

Other things being equal, it is best to apply the rubber, etc., to the aluminum article soon after the alumina coating operation. Coherence is best with a freshly formed coating. If the neoprene is not applied soon after coating, before applying the neoprene it is advantageous to dip the coated article in dilute aqueous ammonia for a few minutes, then dry. This restores the coherent qualities of the coating.

If desired, caustic potash, caustic soda, soda ash or other alkali can be employed in the bath in lieu of ammonia (in reduced proportions such as to give equivalent alkalinity) but ammonia or ammonium carbonate are especially advantageous because they leave no residue on drying and because they establish a reserve alkalinity. The proportion of ammonia need not be so closely controlled as in the case of caustic soda, for example.

What I claim is:

1. In methods of bonding, to the surface of aluminum articles, a plastic selected from the class consisting of rubber, vulcanized rubber, chlorinated rubber, rubber hydrochloride, polymerized chlorobutadienes and butadiene copolymers, the improvement which comprises subjecting the surface of an aluminum article to the action of an aqueous alkaline solution containing in colloidal suspension a substance selected from the class of amphoteric oxides consisting of alumina, titania, zirconia and beryllia, and also containing a second dissolved metal compound selected from the class consisting of compounds of copper and compounds of the iron group of metals, said solution likewise containing a substance capable of forming an ion-containing complex, selected from the class consisting of soluble thiophosphates, phosphates and citrates, glue and gum arabic, the action being continued until there is produced on the article a coherent filmiform coating comprising a hydrated amphoteric oxide carrying an oxide of said second metal; drying the film and cohesively securing a layer of said plastic to the film coating in bonding relation thereto.

2. The method of claim 1 wherein a coating of polymerized chlorobutadiene cement is applied to the film prior to application of the layer of said plastic.

3. The method of claim 1 wherein the bath is maintained at a temperature of 160 to 180 degrees F. during treatment of said article therein.

4. The method of claim 1 wherein the aluminum article treated contains zinc.

5. The method of claim 1 wherein the bath contains colloidally suspended alumina derived from aluminum articles previously treated therein.

MURRAY C. BEEBE.